though in different proportions as shown in the following table, and the dihydroquinacridone being first recrystallized from dimethylformamide. In these examples the pigments are tested as above for lightfastness, with the following results:

United States Patent Office
3,748,162
Patented July 24, 1973

3,748,162
LIGHT STABLE QUINACRIDONEQUINONE YELLOW PIGMENT
William A. West, Newark, Del., assignor to E. I. du Pont de Nemours and Company, Wilmington, Del.
No Drawing. Filed Mar. 19, 1971, Ser. No. 126,375
The portion of the term of the patent subsequent to Aug. 22, 1989, has been disclaimed
Int. Cl. C08h 17/14
U.S. Cl. 106—288 Q        1 Claim

ABSTRACT OF THE DISCLOSURE

Quinacridonequinone is rendered lightfast by the provision of a solid solution thereof with essentially colorless 6,13-dihydroquinacridone.

BACKGROUND OF THE INVENTION

Among the various known quinacridone derivatives is the compound quinacridonequinone. Quinacridonequinone has been described in the literature as having utility as a pigment because of its intense yellow color and low solubility in organic media. As a practical matter, however, compositions pigmented with quinacridonequinone have proven to have extremely poor lightfastness as compared to those pigmented with quinacridone or other quinacridone derivatives. While it has been disclosed that quinacridonequinone could be used as one component of a solid solution of two or more quinacridone derivatives, i.e. in Ehrich U.S. Pat. 3,160,510, it has not heretofore been suggested that it would be possible to utilize quinacridonequinone in a form in which it is essentially the sole colorant of a pigment exhibiting lightfastness and a high degree of transparency, e.g. as for example is needed in the pigmentation of metallized automotive finishes.

SUMMARY OF THE INVENTION

In accordance with the invention there is provided a novel pigment characterized by outstanding lightfastness and by high level two-tone effect in aluminized finishes, said pigment being composed of particles essentially all of which have their largest dimension below 0.1 micron, said particles consisting essentially of a solid solution of (a) 5 to 20% by weight of 6,13-dihydroquinacridone and
(b) 80–95% by weight of quinacridonequinone. As dihydroquinacridone is colorless or nearly so, such a solid solution will have essentially the same color as the corresponding quinacridonequinone if used alone. Occasionally, however, the solid solutions may contain a trace of quinacridone or another quinacridone derivative depending upon the mode of synthesis of the quinacridonequinone.

The solid solutions of the invention are advantageously produced in accordance with the method of U.S. application S.N. 840,500, filed July 9, 1969, now U.S. Pat. 3,607,336, the disclosure of which is incorporated herein by reference. According thereto, a sulfuric acid solution of the quinacridone derivatives is drowned in highly turbulent water to form a precipitate of small particle size, followed by digestion of the precipitate at a temperature from about 40° C. to the boil for about 10 minutes to about 2 hours. For purposes of the present invention, the solution is initially formed by dissolving in sulfuric acid the two or more components in the appropriate weight ratios.

In carrying out the high tuurbulence precipitation technique of application S.N. 840,500, adjustments can be made to increase or lower the temperature rise which occurs on mixing water with the sulfuric acid solution. In general, the greater the increase in temperature rise or the higher the acid concentration in the effluent slurry, the greater will be the tendency to produce larger size pigment particles.

Following precipitation of the pigment particles, the slurry is digested at an elevated temperature to effect solid solution formation and growth of the particles to the desired dimensions. Thereafter a surfactant may optionally be added to improve dispersibility of the solid solution.

The pigment particles of the present invention should have an average particle size less than 0.1 micron. In this form the pigment exhibits a high degree of transparency, as is needed for pigmentation of metallized automotive finishes. Most significantly, the pigments of this invention also afford outstanding lightfastness even when incorporated in relatively low concentrations in such metallized finishes.

The invention will be further illustrated by the following examples in which parts and percentages are by weight unless otherwise indicated. Owing to the drowning technique employed, each of the pigments produced in these examples is composed of particles essentially all of which have their largest dimension below 0.1 micron.

Example 1

In order to prepare the solid solution, 90 parts by weight of quinacridonequinone and 10 parts of 6,13-dihydroquinacridone are dusted into 700 parts of 96% $H_2SO_4$ while the temperature is held below 35° C. While maintaining the temperature at 35° C.±2°, stirring is continued for 1 hour. This sulfuric acid solution is drowned by forcing the solution under pressure through a nozzle into 3500 parts of water at 20° C. while maintaining the water in a highly turbulent state. The resulting aqueous slurry is stirred and heated to 90° C., and held at this temperature for 2 hours. The slurry is then filtered and washed free of sulfate ions.

The pigment is texture-treated by the well known technique involving wet precipitation of calcium rosinate on the pigment. The amount of calcium rosinate used is 10% based on the pigment weight. The pigment is dried at about 60° C. and thereafter is pulverized in a hammer mill.

A portion of the yellow pigment thus produced is incorporated into a thermosetting acrylic enamel. For this purpose the pigment is extended by the use of 50% aluminum flake for metallic effect and sprayed onto panels.

For use as a control, a pigment of 100% quinacridonequinone is prepared in the same manner as before by precipitation from $H_2SO_4$ solution. An enamel is prepared of the control pigment and sprayed on a panel, again as before.

Both panels are exposed in Florida for 6 months with a 5° south exposure and are graded for change in color using an arbitrary scale of units from 0 through 10, 0 indicating complete failure and 10 indicating perfect stability of color. The panel prepared from the solid solution containing 6,13-dihydroquinacridone is rate 7, while the panel using the control pigment is only 4.

Examples 2 and 3

Using the same procedure as given in Example 1, pigments are prepared of quinacridonequinone (QAQ) and (except in the control samples) 6,13-dihydroquinacridone (DQA). These pigments are prepared using the following amounts of the components:

| Example | Parts by weight used in acid pasting | | Lightfast rating of pigment product | Color of pigment |
|---|---|---|---|---|
| | QAQ | DQA | | |
| Control | 100 | 0 | 4 | Yellow. |
| 2 | 85 | 15 | [1] 5.5 | Do. |
| 3 | 95 | 5 | 5.5 | Do. |

[1] Darkens.

From these results it is evident that the pigments of this invention, i.e. the solid solutions containing 6,13-dihydroquinacridone, are superior in lightfastness to the controls containing only quinacridonequinone.

Example 4

This example describes the preparation of a quinacridonequinone/6/13 - dihydroquinacridone solid solution containing a trace amount of quinacridone owing to the process used to synthesize the quinacridonequinone. The synthesis involves a cojoint oxidation in which a quinacridone/6,13-dihydroquinacridone mixture is treated with a chromate oxidizing agent. The bulk of the quinacridone is oxidized to quinacrdonequinone and a portion of the dihydroquinacridone is oxidized to quinacridonequinone.

To 700 parts of 96% sulfuric acid are added portionwise 60 parts of quinacridone and 40 parts of 6,13-dihydroquinacridone. The mixture is stirred at 30–35° C. until the solution is complete. It is then diluted with 2700 parts of water under conditions of high turbulence as in Example 1. A solution of 135 parts of sodium dichromate dihydrate in 200 parts of water is added all at once and the mixture heated to 88° C. The mixture is stirred for one hour at 88° C., after which time a solution of 4 parts of an isopropylamine salt of a C–12 substituted benzenesulfonic acid surfactant dissolved in 15 parts of perchloroethylene is added. After stirring at 88° C. for 15 minutes, the perchloroethylene is removed by steam distillation. The pigment is isolated by filtration and washing, and is then treated with calcium rosinate as in Example 1.

The resultant solid solution, virtually identical in all respects to that of Example 1, is found to be composed of 10% 6,13-dihydroquinacridone, 89% quinacridonequinone and 1% quinacridone. Again the product exhibits a marked superiority in lightfastness as compared to a pigment of 100% quinacridonequinone.

What is claimed is:

1. A novel pigment characterized by outstanding lightfastness and by high level two-tone effect in aluminized finishes, said pigment being composed of particles essentially all of which have their largest dimension below 0.1 micron, said particles consisting essentially of a solid solution of
   (a) 5 to 20% by weight of 6,13-dihydroquinacridone and
   (b) 80–95% by weight of quinacridonequinone.

References Cited
UNITED STATES PATENTS

| 3,160,510 | 12/1964 | Ehrich | 106—288 Q |
| 3,298,847 | 1/1967 | Hanke | 106—288 Q |
| 3,607,336 | 9/1971 | Jaffe | 106—288 Q |

JAMES E. POER, Primary Examiner